United States Patent [19]

Kao

[11] Patent Number: 5,527,636
[45] Date of Patent: Jun. 18, 1996

[54] GREEN POWER SUPPLY FOR A SMALL CALCULATOR

[76] Inventor: Sung N. Kao, 2nd Fl., No. 2, Alley 59, Lane 42, Min Chuan Rd., Hsin Tien City, Taipei Hsien, Taiwan

[21] Appl. No.: 283,831

[22] Filed: Aug. 1, 1994

[51] Int. Cl.$^6$ .................. H01M 2/38; H01M 2/10
[52] U.S. Cl. ................. 429/68; 429/67; 429/96; 429/97; 429/98; 429/100; 429/113; 429/150; 429/151; 307/139; 307/140; 307/150
[58] Field of Search ................. 429/96, 97, 98, 429/100, 67, 113, 150, 151, 68; 307/150, 139, 140

[56] References Cited

U.S. PATENT DOCUMENTS

| | | | |
|---|---|---|---|
| 4,957,831 | 9/1990 | Meredith et al. | 429/97 |
| 5,011,747 | 4/1991 | Strong et al. | 429/67 |
| 5,256,502 | 10/1993 | Kump | 429/150 |
| 5,389,461 | 2/1995 | Rebondy et al. | 429/113 |

*Primary Examiner*—Bruce F. Bell
*Attorney, Agent, or Firm*—Gunn, Lee & Miller

[57] ABSTRACT

A calculator includes a shell defining two slots. The calculator uses a switch and a power supply. The switch includes two tubular portions projecting therefrom and being slidably received in the slots so that the switch can be moved between ON and OFF positions. The power supply uses a plate defining two apertures. Two screws are inserted through the apertures and secured in the tubular portions, thus joining the switch with the plate for retaining the switch on the shell. A casing is received in the shell so that the plate is enclosed in the casing. At least one container is formed on the casing and defining an inlet through which aqueous solution of salt can be filled into the container and an outlet through which the casing is in fluid communication with the container. At least one pair of positive and negative electrodes is attached to the plate. At least one absorber is received in the casing. At least one filament is inserted through the outlet for inducing the aqueous solution of salt from the container to absorber. In the OFF position, the electrodes do not contact the absorber so as to prevent any chemical reaction between the electrodes and the aqueous solution of salt so as not to generate a current. In the ON position, the electrodes contact the absorber so as to allow a chemical reaction between the electrodes and the aqueous solution of salt to occur so as to generate a current.

5 Claims, 4 Drawing Sheets

GREEN POWER SUPPLY FOR A SMALL CALCULATOR

BACKGROUND OF THE INVENTION

This invention relates to a 'green' (environmentally friendly) power supply for a small calculator, e.g., a pocket calculator, a hand-held calculator or a desk-top calculator.

Small calculators, e.g., pocket calculators, hand-held calculators and desk-top calculators, require appropriate power supplies so as to support normal functions thereof. Such power supplies are classified into two types: batteries and solar cells. Such batteries are classified into three sorts: nickel-chromium batteries, nickel-cadmium batteries and mercury batteries. Such batteries must be disposed of after use, and unfortunately cause serious environmental problems. There have been 'green' batteries, but such batteries have not been successfully commercialized due to their high costs. Solar cells do not cause serious environmental problems, as they last a long time. However, as solar cells are dependent on sufficient light, they can be used only in certain places wherein light is sufficient. Therefore, there is a unfulfilled need for a 'green' power supply which functions normally regardless of light intensity and is inexpensive.

SUMMARY OF THE INVENTION

It is the primary object of this invention to provide a 'green' power supply for a small calculator, e.g., a pocket calculator, a hand-held calculator or a desk-top calculator.

The primary object of this invention is achieved by providing a switch and a power supply. The switch includes two tubular portions projecting therefrom and being slidably received in two slots being defined in a calculator shell so that the switch can be moved between ON and OFF positions. The power supply uses a plate defining two apertures. Two screws are inserted through the apertures and secured in the tubular portions, thus joining the switch with the plate for retaining the switch on the shell. A casing is received in the shell so that the plate is enclosed in the casing. At least one container is formed on the casing and defining an inlet through which aqueous solution of salt can be filled into the container and an outlet through which the casing is in fluid communication with the container. At least one pair of positive and negative electrodes is attached to the plate. At least one absorber is received in the casing. At least one filament is inserted through the outlet for inducing the aqueous solution of salt from the container to absorber. In the OFF position, the electrodes do not contact the absorber so as to prevent any chemical reaction between the electrodes and the aqueous solution of salt so as not to generate a current. In the ON position, the electrodes contact the absorber so as to allow a chemical reaction between the electrodes and the aqueous solution of salt to occur so as to generate a current.

DETAILED DESCRIPTION OF THE PREFERRED EMBODIMENT

Figure 1:
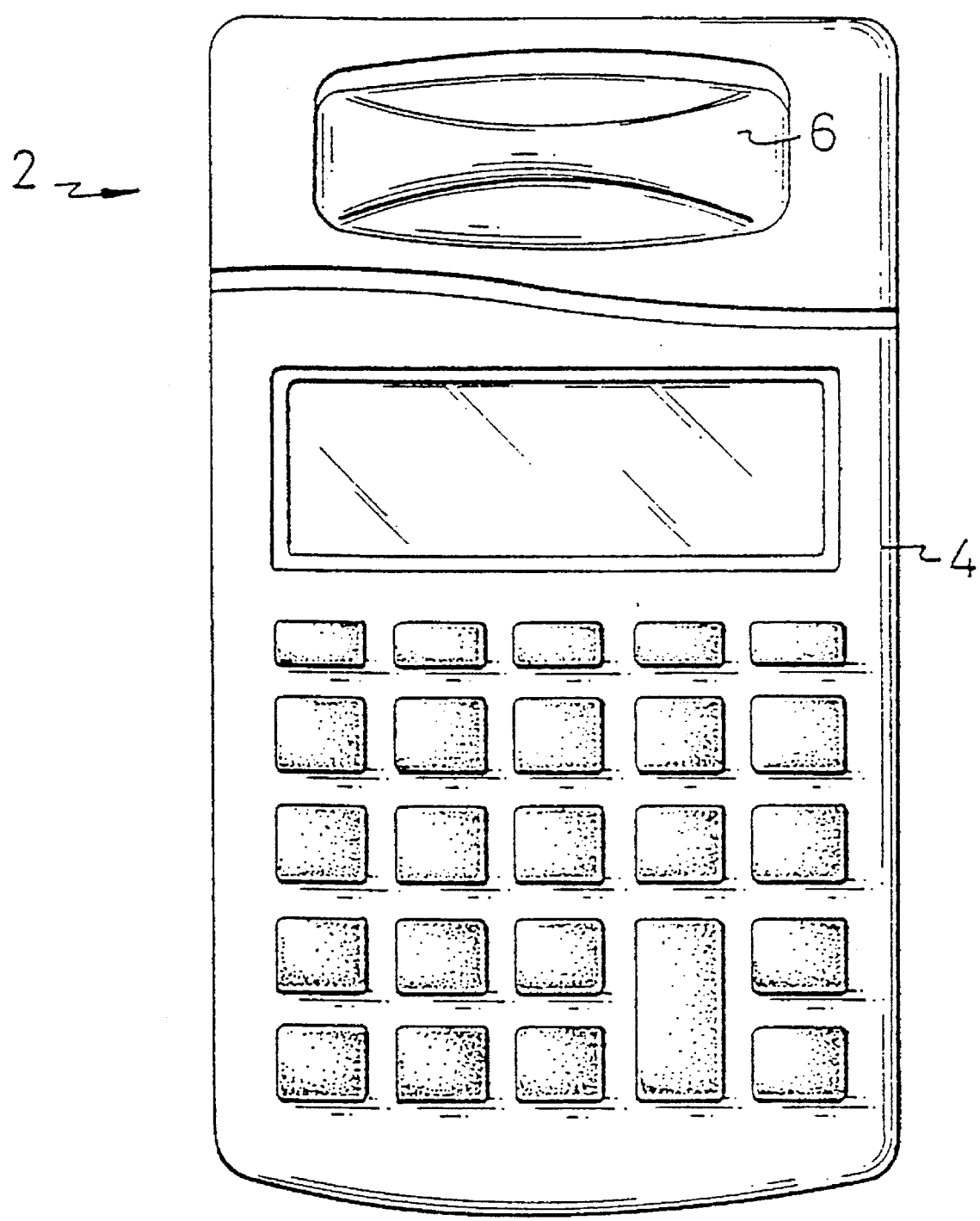
FIG. 1 is a front view of a small calculator which uses a power supply in accordance with this invention.

FIG. 1 shows a small calculator 2, e.g., a pocket calculator, a hand-held calculator or a desk-top calculator. The small calculator 2 includes a shell 4 and a switch 6. The shell 4 contains a 'green' power supply which will be described with reference to FIGS. 2–5. The switch 6 is connected with the 'green' power supply. The calculator 2 can be turned between ON and OFF positions by manipulating the switch 6.

Figure 2:
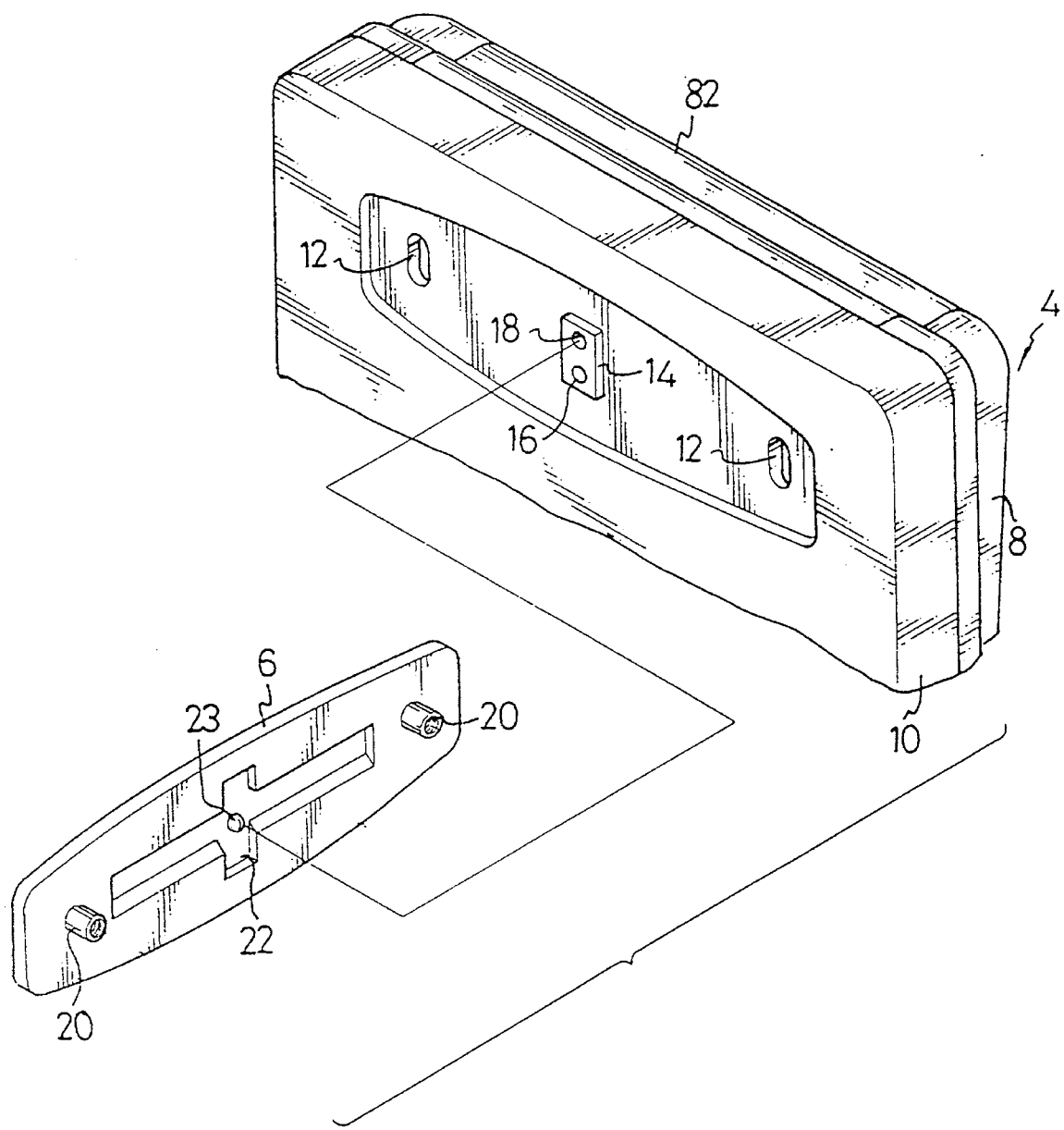
FIG. 2 is an exploded view of a small calculator which uses a power supply in accordance with this invention.

Referring to FIG. 2, the shell 4 includes a front panel 8 and a rear panel 10. Two slots 12 are vertically defined in the front panel 8. A guide 14 is raised from a front side of the front panel 8. The guide 14 is located between the slots 12. Two recesses 16 and 18 are defined in the front side of the guide 14. The recess 16 is located below the recess 18.

Two tubular portions 20 project from a rear side of the switch 6. A cavity 22 is defined in the rear side of the switch 6. The cavity 22 defines a bottom from which a boss 23 projects.

When the switch 6 is mounted on the front panel 8, the tubular portions 20 are slidably received in the slots 12, the guide 14 is slidably received in the cavity 22. The switch 6 can be moved between ON and OFF positions. The boss 23 is received in the recess 16 when the switch is in the OFF position, and is received in the recess 18 when the switch 6 is in the ON position. The boss 23 is received in one of the recesses 16 and 18 in order to retain the switch 6 in one of the OFF and ON positions. However, the recesses 16 and 18 must be shallow so that the boss 23 can be easily moved into and removed from them.

Figure 3:
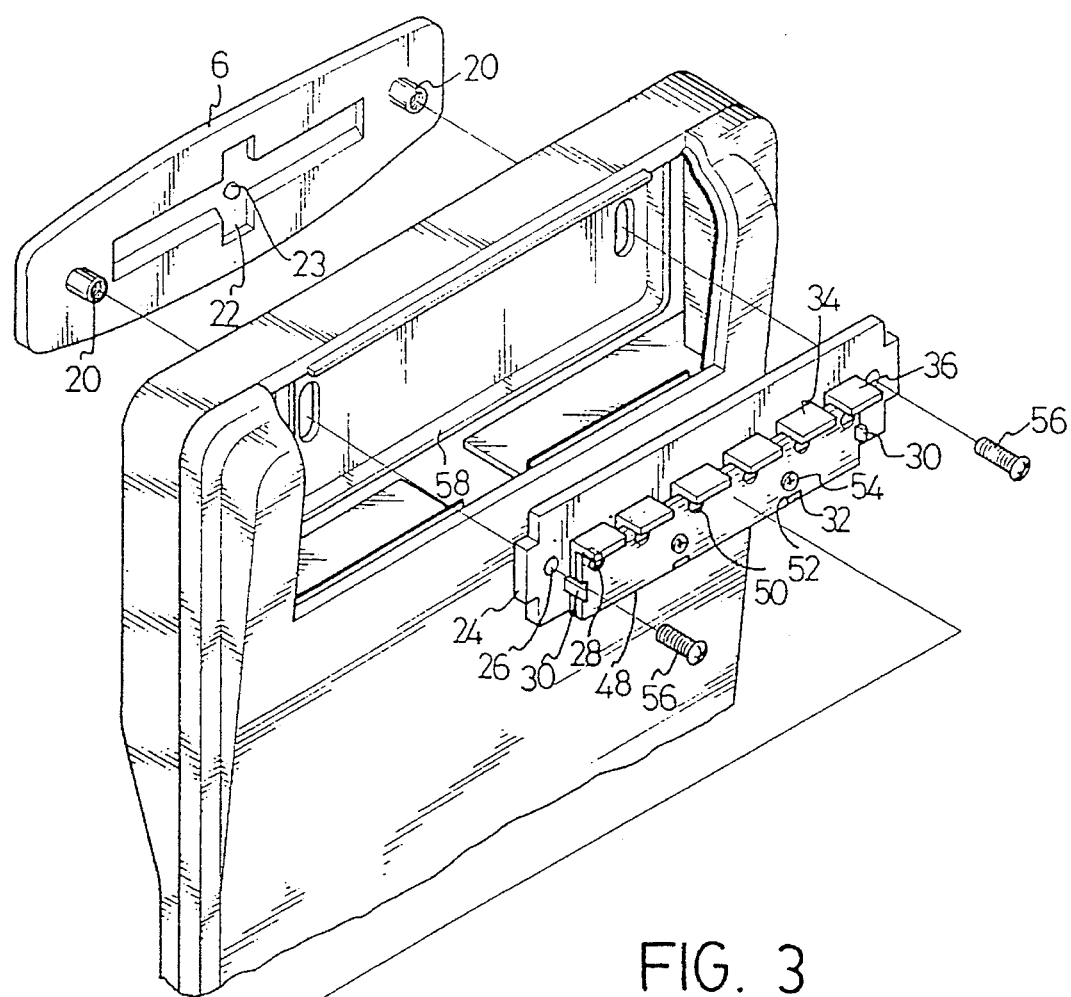
FIG. 3 is an exploded view of a power supply in accordance with this invention.
Figure 3:
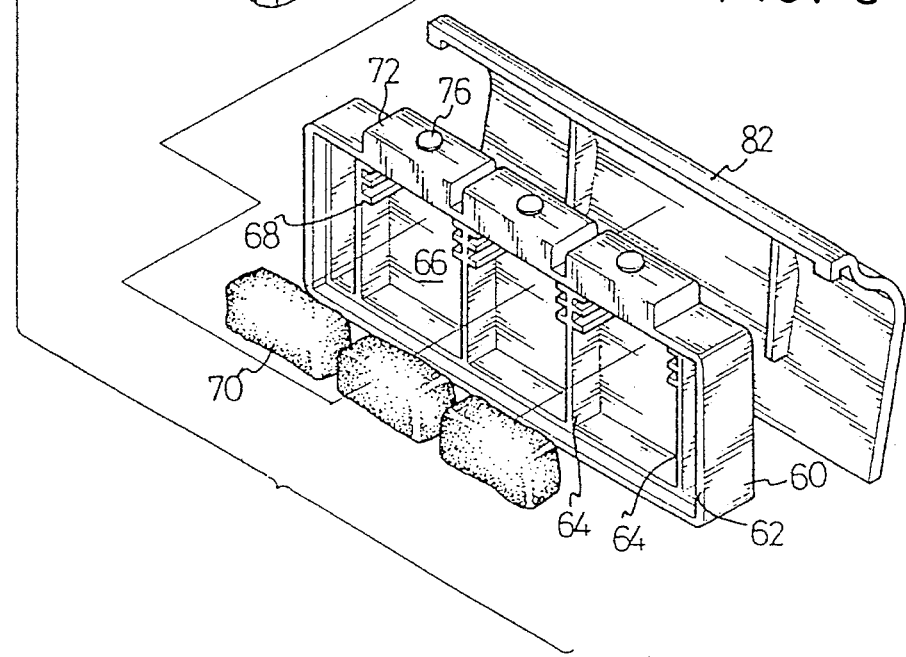

Referring to FIG. 3, in accordance with the preferred embodiment of this invention, the power supply includes three batteries which are connected in series. Each battery uses an absorber 70 for absorbing 10% aqueous solution of salt and a pair of positive and negative electrodes 34 and 36. The positive electrode 34 is made of copper. The negative electrode 36 is made of zinc. When the electrodes 34 and 36 contact the absorber 70, a chemical reaction occurs between the electrodes 34 and 36 and the aqueous solution of salt so as to generate a current. The voltage which is generated by means of such a battery is fixed, as the potential difference between copper and zinc is fixed. Therefore, if the small calculator 2 needs higher voltage, more batteries can be connected in series.

Three pairs of electrodes 34 and 36 are mounted on a first plate 24. The plate 24 defines two apertures 26 corresponding to the tubular portions 20. Six bosses 28, two hooks 30 and two tabs 32 project from a rear side of the first plate 24.

Each of the electrodes 34 and 36 is an L-shaped strip, i.e., it has first and second portions being perpendicular to each other. Each of the electrodes 34 and 36 defines an aperture (not shown) in the second portion. The electrodes 34 and 36 are mounted on the first plate 24 as the bosses 28 are received in the apertures defined therein.

A second plate 48 defines six apertures 50 corresponding to the bosses 28 and two cutouts 52 corresponding to the tabs 32. The second plate 48 is mounted on the first plate 24 as the bosses 28 are received in the apertures 50 and the tabs 32 are received in the cutouts 52. The second plate 48 is retained on the first plate 24 by means of the hooks 30. The second plate 48 is further retained on the first plate 24 by means of two screws 54. The second portions of the electrodes 34 and 36 are sandwiched between the first and second plates 24 and 48. The plates 24 and 48 and the electrodes 34 and 36 are combined.

Two screws 56 are inserted through the apertures 26 in order to be secured in the tubular portions 20 so that the first and second plates 24 and 48 and the electrodes 34 and 36 are attached to the switch 6. The switch 6 and the electrodes 34 and 36 can be moved synchronously.

A flange 58 is raised from a rear side of the front panel 8. The flange 58 extends in a rectangle.

A casing 60 includes an edge 62 corresponding to the flange 58. The casing 60 can be mounted on the front panel 8 by engaging the edge 62 with the flange 58.

Figure 4:
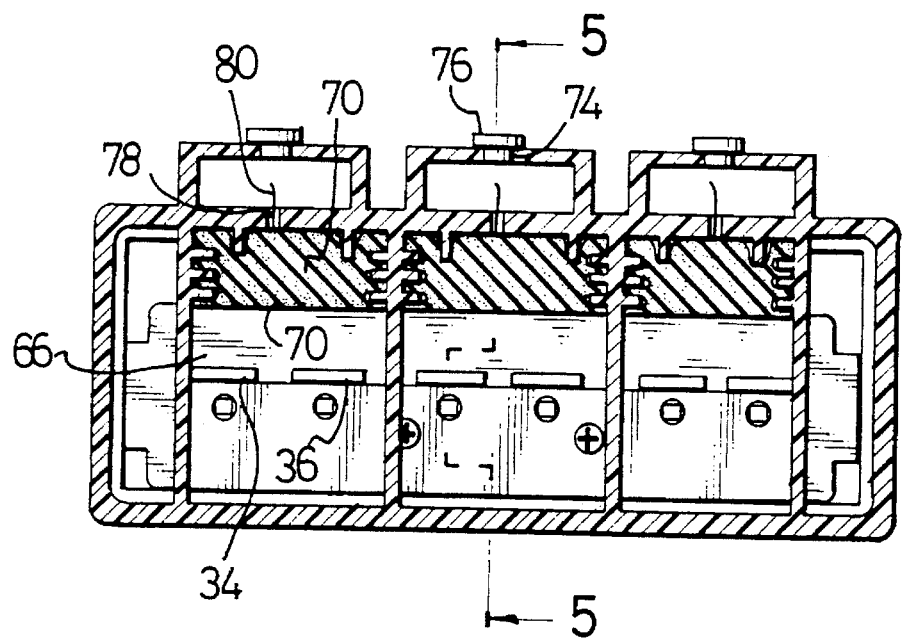
FIG. 4 is a cross-sectional view of a power supply in accordance with the present invention.

The casing 60 is divided by four partitions 64 which are formed thereon into three chambers 66 each of which is located between two of the partitions 64. Each of the partitions 64 includes at least one chamber-facing side which faces one of the chambers 66. A plurality of ribs 68 are formed on each of the chamber-facing side of each of the partitions. Three containers 72 are formed on the casing 60 in order to contain the 10% aqueous solution of salt. Referring to FIG. 4, each of the containers 72 defines an inlet 74 which can be sealed by means of a plug 76 and an outlet 78 through which each of the containers 72 is in fluid communication with one of the chambers 66. An absorber 70, e.g., a cotton block or a sponge, is retained in each of the chambers 66 by means of the ribs 68. A filament 80 is inserted through each of the outlets 78 in order to induce 10% aqueous solution of salt from each of the containers 72 to one of the absorbers 70.

The rear panel 10 defines an opening (not numbered) through which the above-mentioned components can be inserted and removed from the shell. The opening can be sealed by means of a cover 82 which will not be further described as it is well known.

Figure 5:
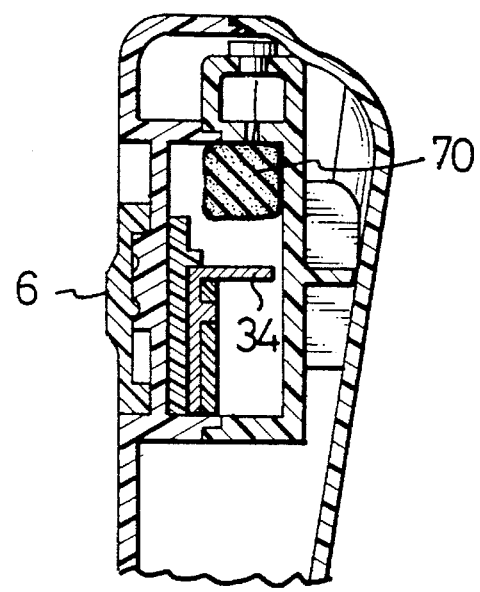
FIG. 5 is a cross-sectional view taken in a line 5—5 in FIG. 4.

Referring to FIGS. 4 and 5, each pair of electrodes 34 and 36 is received in one of the chambers 66, so that each pair of electrodes 34 and 36 is located below one of the absorbers 70. The switch 6 is disposed in the OFF position, so that the first portions of the electrodes 34 and 36 do not contact the absorbers 70, thus preventing any chemical reaction between the electrodes 34 and 36 and the 10% aqueous solution of salt. Thus, when the small calculator 2 is turned off, the electrodes 34 and 36 can be protected from erosion without being removed from the small calculator 2. This is a significant advantage over conventional batteries which disperse power if they are not removed from calculators.

The switch 6 can be moved to the ON position so that each pair of electrodes 34 and 36 contacts a corresponding absorber 70, thus actuating a chemical reaction between the electrodes 34 and 36 and the aqueous solution of salt so as to produce a current.

If the area of the first portion of each strip is 1.00 cm$^2$, the power produced is a DC of 52 µA and 1.5–1.6 volts The magnitude of the current produced is a function of the area of the first portion of each strip. In the preferred embodiment, the area of the first portion of each strip is 0.48 cm$^2$ (0.71 cm×0.67 cm) so that the power produced is a DC of 42 µA and 1.4–1.5 volts in order to power the circuit of the small calculator 2. Such a current is sufficient for powering a small calculator which generally consumes a current of 10 µA.

The small calculator 2 is as compact as any small calculators which employ conventional batteries, as the power supply in accordance with the present invention occupies only a small space.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

What is claimed is:

1. A power supply for a calculator including a shell defining two slots, wherein the power supply comprises:

a switch comprising two tubular portions which project therefrom and are slidably received in the slots so that the switch can be moved between ON and OFF positions;

a first plate defining two apertures;

two screws being inserted through the apertures and secured in the tubular portions, thus joining the switch with the plate for retaining the switch on the shell;

a casing being received in the shell so that the plate is enclosed in the casing;

at least two containers which are formed on the casing and each define an inlet through which aqueous solution of salt can be filled into the container and an outlet through which the casing is in fluid communication with the container;

at least two pairs of positive and negative electrodes being attached to the plate;

at least two absorbers being received in the casing; and at least two filaments each being inserted through the outlet of a corresponding container for inducing the aqueous solution of salt from the corresponding container to a corresponding absorber;

whereby in the OFF position, each pair of electrodes does not contact a corresponding absorber to prevent any chemical reaction between the pair of electrodes and the aqueous solution of salt not to generate a current, and in the ON position, each pair of electrodes contacts the corresponding absorber to allow a chemical reaction between the pair of electrodes and the aqueous solution of salt to occur to generate a current.

2. A power supply in accordance with claim 1 wherein each of the electrodes comprises a vertical portion and a horizontal portion for contacting a corresponding absorber.

3. A power supply in accordance with claim 1 wherein the plate comprises two bosses projecting therefrom, wherein each of the electrodes defines an aperture, wherein the bosses are inserted in the apertures.

4. A power supply in accordance with claim 1 comprising a second plate and two screws for joining the first plate with the second plate so that the pairs of electrodes are sandwiched between the first and second plates.

5. A power supply in accordance with claim 1 wherein the first plate comprises two hooks projecting therefrom for retaining the second plate on the first plate.

\* \* \* \* \*